US008805893B2

(12) United States Patent
Rogers

(10) Patent No.: US 8,805,893 B2
(45) Date of Patent: Aug. 12, 2014

(54) DYNAMIC GENERATION OF A CONFIGURATION FILE

(75) Inventor: Ben Jeffrey Rogers, Fairbanks, AK (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 13/370,060

(22) Filed: Feb. 9, 2012

(65) Prior Publication Data

US 2013/0212132 A1  Aug. 15, 2013

(51) Int. Cl.
*G06F 17/30* (2006.01)
*G06F 9/44* (2006.01)

(52) U.S. Cl.
CPC .................................. *G06F 8/73* (2013.01)
USPC .......................................... 707/802; 717/120

(58) Field of Classification Search
None
See application file for complete search history.

(56) References Cited

U.S. PATENT DOCUMENTS

| 5,832,505 A | * | 11/1998 | Kasso et al. ................. 1/1 |
| 7,490,298 B2 | * | 2/2009 | Bauman et al. ............ 715/788 |
| 2003/0023707 A1 | * | 1/2003 | Ryan .......................... 709/220 |
| 2005/0005233 A1 | * | 1/2005 | Kays et al. ................ 715/500.1 |
| 2005/0097522 A1 | * | 5/2005 | Backhouse et al. ......... 717/136 |
| 2006/0174320 A1 | | 8/2006 | Maru et al. |
| 2007/0244897 A1 | | 10/2007 | Voskuil et al. |
| 2009/0222884 A1 | | 9/2009 | Shaji et al. |
| 2009/0276771 A1 | * | 11/2009 | Nickolov et al. ............. 717/177 |
| 2009/0282133 A1 | * | 11/2009 | Walker et al. ............... 709/221 |
| 2010/0031352 A1 | | 2/2010 | Kethireddy |
| 2010/0037150 A1 | * | 2/2010 | Sawant ........................ 715/753 |
| 2011/0060995 A1 | * | 3/2011 | Whalen et al. ............. 715/736 |
| 2011/0154305 A1 | * | 6/2011 | LeRoux et al. ............. 717/140 |

* cited by examiner

*Primary Examiner* — Tarek Chbouki
(74) *Attorney, Agent, or Firm* — Wolfe-SBMC

(57) ABSTRACT

A display device in operable communication with a computing device displays a document associated with a software application. Further, the computing device receives an element input indicating at least one element from the document. In addition, the computing device receives a parameter input indicating a control feature corresponding to the at least one element. The computing device also generates a configuration file that configures the at least one element to operate according to the control feature.

24 Claims, 4 Drawing Sheets

DYNAMIC GENERATION OF A CONFIGURATION FILE

BACKGROUND

1. Field

This disclosure generally relates to computing devices. More particularly, the disclosure relates to dynamic generation of a configuration file.

2. General Background

Many software providers face difficult challenges in deploying their software. For example, software deployment in an enterprise environment often involves extensive pre-deployment configuration. Enterprise environments typically utilize software across a large number of computing devices. To ensure that the software running on those computing devices behave in the same or intended ways, that software is generally managed by configuration files. Such configurations files are typically generated prior to deployment. An example of such a configuration file is a Group Policy Object ("GPO") template, which is utilized by many personal computers ("PCs"). Another example of such a configuration file is a Property List file ("p-list file"), which is utilized by many Macintosh computers.

Although generating such configuration files provides for management of the software in enterprise environments, very few software providers have the resources to develop such configuration files and send them with the software deployment. Further, the small number of software providers that do have the resources to develop such configuration files typically develop incomplete configuration files. Other configuration files are long, esoteric, incomplete, not kept up to date, etc. As a result, IT professionals, who deploy and manage software in enterprise environments, often do so without vendor provided configuration files or with cumbersome configurations files that are difficult to utilize.

SUMMARY

In one aspect of the disclosure, a computer program product is provided. The computer program product includes a computer useable medium having a computer readable program. The computer readable program when executed on a computer causes the computer to display, at a display device in operable communication with a computing device, a document associated with a software application. Further, the computer readable program when executed on the computer causes the computer to receive, at the computing device, an element input indicating at least one element from the document. In addition, the computer readable program when executed on the computer causes the computer to receive, at the computing device, a parameter input indicating a control feature corresponding to the at least one element. The computer readable program when executed on the computer causes the computer to generate, at the computing device, a configuration file that configures the at least one element to operate according to the control feature.

In another aspect of the disclosure, a process is provided. The process displays, at a display device in operable communication with a computing device, a document associated with a software application. Further, the process receives, at the computing device, an element input indicating at least one element from the document. In addition, the process receives, at the computing device, a parameter input indicating a control feature corresponding to the at least one element. The process also generates, at the computing device, a configuration file that configures the at least one element to operate according to the control feature.

In yet another aspect of the disclosure, an apparatus is provided. The apparatus includes a display device that displays a document associated with a software application. Further, the apparatus includes a reception module that receives (i) an element input indicating at least one element from the document and (ii) a parameter input indicating a control feature corresponding to the at least one element. The apparatus also includes a processor that generates a configuration file that configures the at least one element to operate according to the control feature.

BRIEF DESCRIPTION OF THE DRAWINGS

The above-mentioned features of the present disclosure will become more apparent with reference to the following description taken in conjunction with the accompanying drawings wherein like reference numerals denote like elements and in which.

DETAILED DESCRIPTION

A computer program product, method, apparatus, and system allow a user to automatically generate a configuration directly from documentation. In contrast with a software vendor generating a configuration file prior to software deployment, this approach provides each end user with the flexibility to generate his or her own configuration file. Each user may tailor the configuration file to his or her own needs rather than having to utilize a mass produced configuration file that that may not be suitable for each individual user's needs. Further, users may utilize far less time in having to go back and forth between the documentation and the configuration file as the configuration file is directly generated by the user from the documentation. By having an effective way to access configuration files that exactly meet their business requirements, IT professionals may be more likely to leverage and utilize features in configuration files that may otherwise lay dormant. In addition, end users do not have to wait for the software vendor to supply adjustments to the configuration file.

Further, software vendors may provide a deliverable with additional capabilities that obviate the need for another deliverable. For example, the configurations provided for herein remove the tasks of engineering, testing, and delivery of GPO templates. Accordingly, software developers may save resources or expend resources elsewhere.

Figure 1:
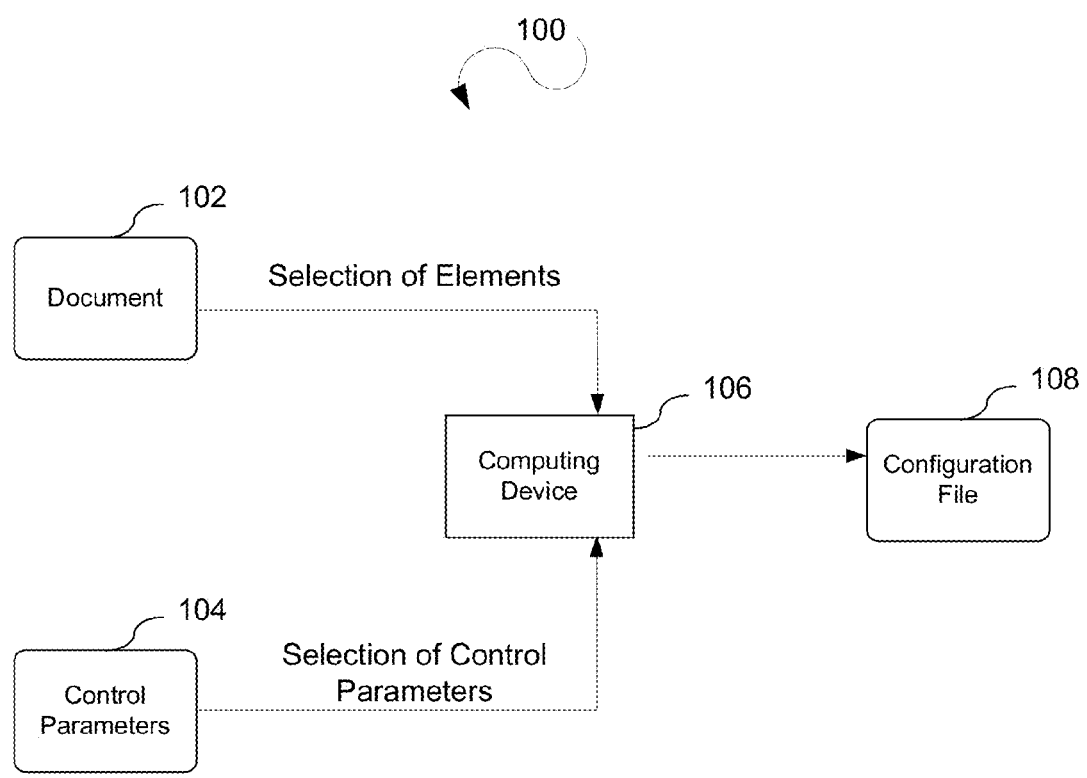
FIG. 1 illustrates an example of a configuration file generation system.

FIG. 1 illustrates an example of a configuration file generation system 100. The configuration file generation system 100 includes a document 102, a set of control parameters 104, a computing device 106, and a configuration file 108. The document 102 may be any documentation that is included with the software. As an example, the document 102 may be HTML-based documentation. The user may select elements from that documentation. For example, the user may elect Document Object Model ("DOM") tree elements from the documentation. In one embodiment, the user may drag and drop the DOM tree elements from the documentation to select particular elements for the configuration file. Further, the set of control parameters 104 allows the user to provide control parameters for each of the selected elements. As example control parameters, the user may select a platform, format, class, or the like. These control parameters may be selected by the user via a GUI. For example, lists, check boxes, or the like may be utilized by the user to select control parameters. In one embodiment, the set of control parameters 104 is optional. In other words, the configuration file may be generated according to the selection of the elements of the document without a selection of any control parameters.

The computing device 106 may be utilized to generate the configuration file 108. The computing device 106 receives the selection of the elements from the document 102 and the selection of the control parameters from the set of control parameters 104. The computing device 106 may then automatically generate the configuration file based on the selection of the elements and the selection of the control parameters so that the user has a configuration filed tailored to his or her needs. Instead of having to utilize a preconfigured configuration file that may not address all of a user's needs or having to go through the long and arduous process of manually preparing a configuration file, the user may utilize a GUI to select the elements and control parameters for the configuration file. The configuration may then be automatically generated. As an example, the computing device 106 may utilize a set of code that generates the configuration file based on the selected elements and the selected control parameters. In one embodiment, the computing device utilizes a processor that processes the set of code.

Figure 2:
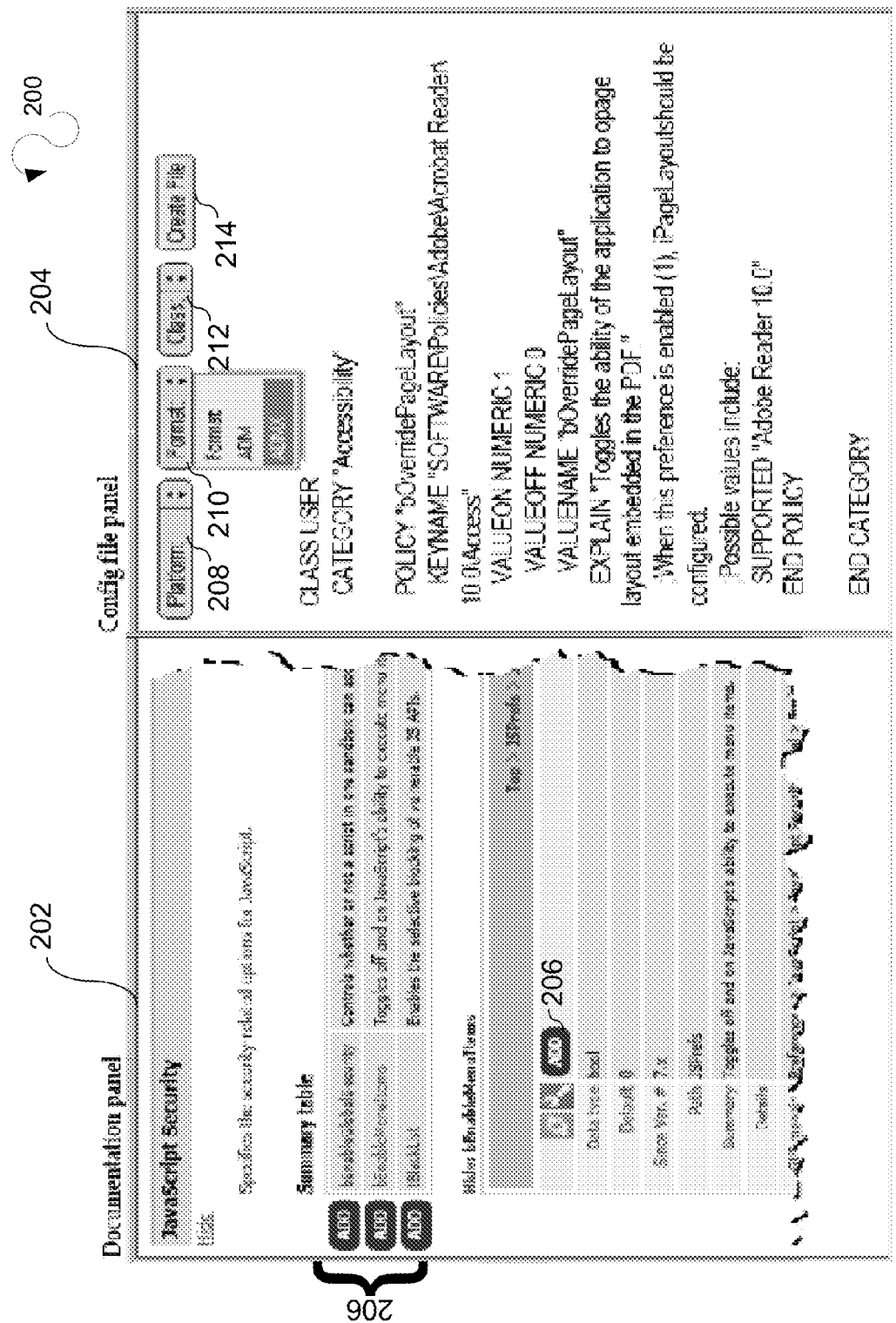
FIG. 2 illustrates an example of a selection graphical user interface ("GUI") that may be utilized to select the elements from the document and the control parameters from the set of control parameters illustrated in FIG. 1.

FIG. 2 illustrates an example of a selection GUI 200 that may be utilized to select the elements from the document 102 and the control parameters from the set of control parameters illustrated in FIG. 1. The selection GUI 200 includes a documentation panel 202 and a configuration file panel 204. The documentation panel 202 provides a view of the document. In one embodiment, various actions may be performed by the user to select elements from the document for inclusion in the configuration file. For example, a user may select a button 206 that adds an element to the configuration file. Various other input indicia or actions may be utilized to perform the selection of elements. For example, a drag and drop action of an element may be performed to select the element. For example, the user may drag and drop the element from the documentation panel 202 to the configuration file panel 204 to select an element from the document for inclusion in the configuration file.

Further, as an example, the configuration file panel has a variety of drop down menus that may be utilized to select control parameters. For example, a platform drop down menu 208 may be utilized to select a control feature for the platform control parameter, a format drop down menu 210 may be utilized to select a control feature for the format control parameter, and a class drop down menu 212 may be utilized to select a control feature for the class parameter. Various other types of input methods other than drop down menus may be utilized, e.g., lists, check boxes, or the like.

In addition, an input may be provided by the user to indicate that the configuration file 108 illustrated in FIG. 1 should be automatically generated. For example, the input may be a selection of a button such as a create file button 214. Various other types of input methods other than a button may be utilized. As a result of receiving such input, the computing device 106 illustrated in FIG. 1 may utilize a set of code to generate the configuration file 108.

Figure 3:
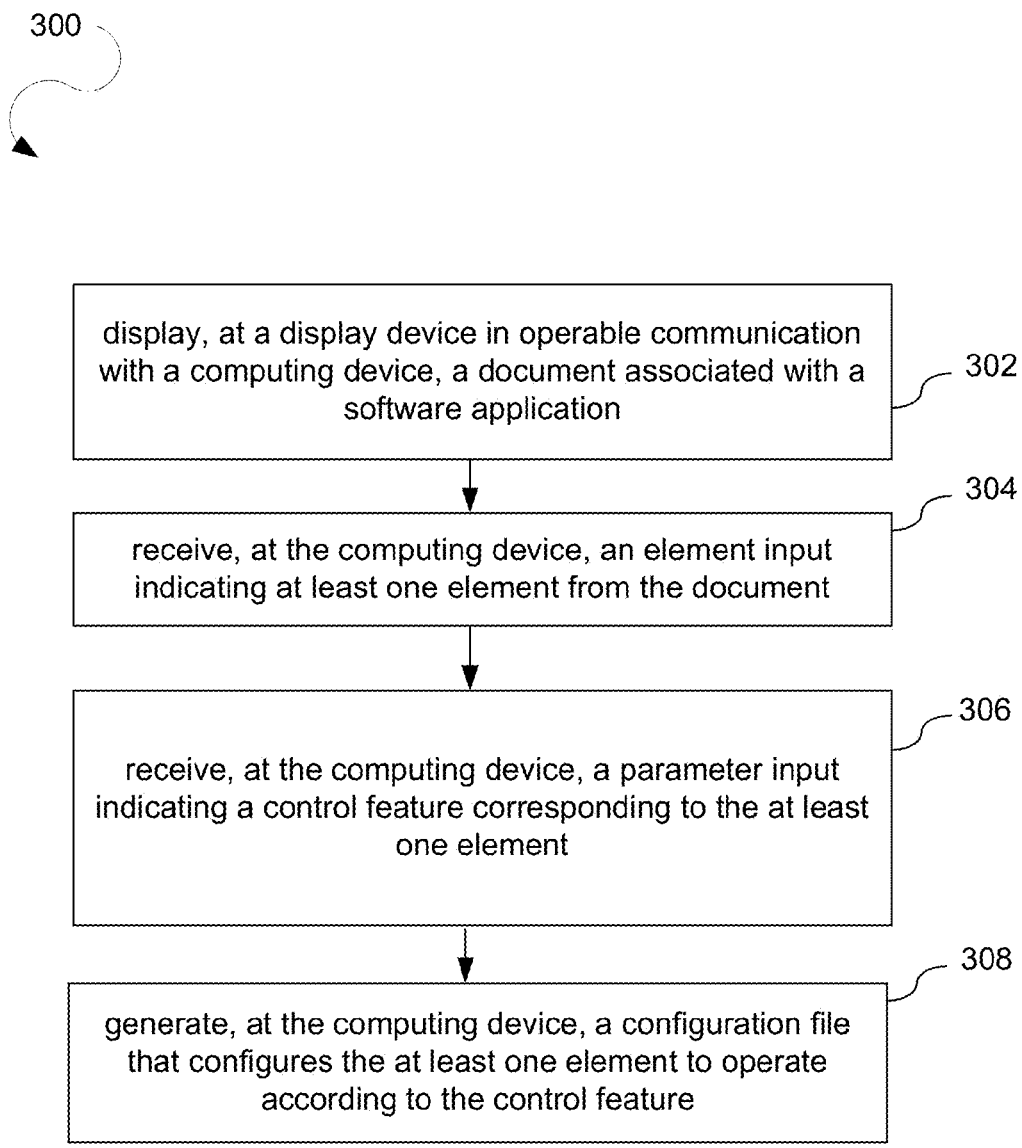
FIG. 3 illustrates a process that may be utilized to generate a configuration file.

FIG. 3 illustrates a process 300 that may be utilized to generate a configuration file. At a process block 302, the process 300 displays, at a display device in operable communication with a computing device, a document associated with a software application. Further, at a process block 304, the process 300 receives, at the computing device, an element input indicating at least one element from the document. In addition, at a process block 306, the process 300 receives, at the computing device, a parameter input indicating a control feature corresponding to the at least one element. At a process block 308, the process 300 also generates, at the computing device, a configuration file that configures the at least one element to operate according to the control feature.

Any of the configurations described herein may be utilized with a variety of computing devices. A computing device may be a PC, laptop, notebook, smartphone, cell phone, tablet device, personal digital assistant ("PDA"), kiosk, or the like. Further, any of the configurations described herein may be utilized with a variety of different user interfaces.

Figure 4:
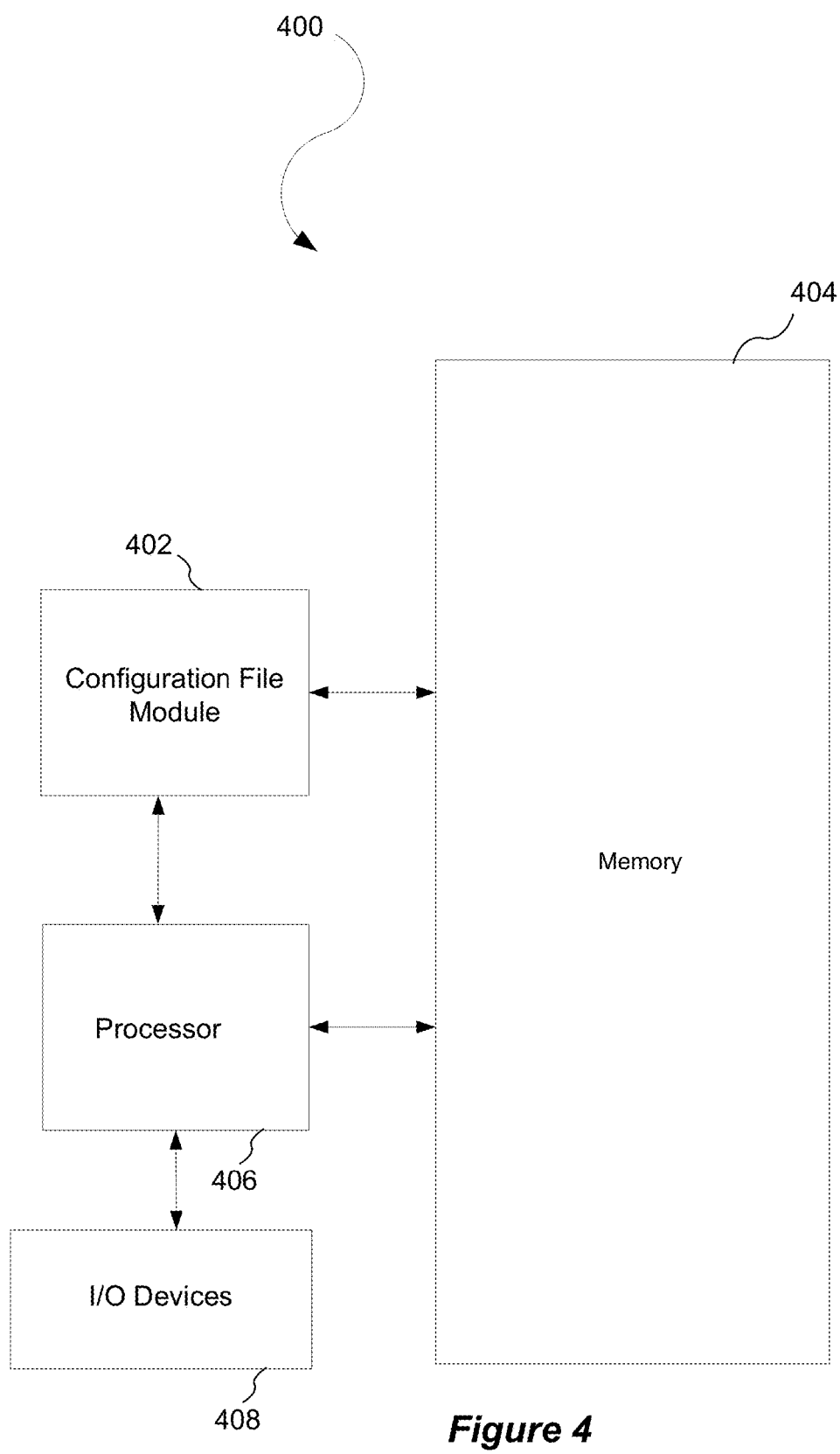
FIG. 4 illustrates a system configuration that may be utilized to generate a configuration file.

FIG. 4 illustrates a system configuration 400 that may be utilized to generate a configuration file. In one embodiment, a configuration file module 402 interacts with a memory 404 and a processor 406. In one embodiment, the system configuration 400 is suitable for storing and/or executing program code and is implemented using a general purpose computer or any other hardware equivalents. The processor 406 is coupled, either directly or indirectly, to the memory 404 through a system bus. The memory 404 may include local memory employed during actual execution of the program code, bulk storage, and/or cache memories which provide temporary storage of at least some program code in order to reduce the number of times code must be retrieved from bulk storage during execution.

The Input/Output ("I/O") devices 408 may be coupled directly to the system configuration 400 or through intervening input/output controllers. Further, the I/O devices 408 may include a keyboard, a keypad, a mouse, a microphone for capturing speech commands, a pointing device, and other user input devices that will be recognized by one of ordinary skill in the art. Further, the I/O devices 408 may include output devices such as a printer, display screen, or the like. Further, the I/O devices 408 may include a receiver, transmitter, speaker, display, image capture sensor, biometric sensor, etc. In addition, the I/O devices 408 may include storage devices such as a tape drive, floppy drive, hard disk drive, compact disk ("CD") drive, etc. Any of the modules described herein may be single monolithic modules or modules with functionality distributed in a cloud computing infrastructure utilizing parallel and/or pipeline processing.

Network adapters may also be coupled to the system configuration 400 to enable the system configuration 400 to become coupled to other systems, remote printers, or storage devices through intervening private or public networks. Modems, cable modems, and Ethernet cards are just a few of the currently available types of network adapters.

The processes described herein may be implemented in a general, multi-purpose or single purpose processor. Such a processor will execute instructions, either at the assembly, compiled or machine-level, to perform the processes. Those instructions may be written by one of ordinary skill in the art following the description of the figures corresponding to the processes and stored or transmitted on a computer readable medium. The instructions may also be created utilizing source code or any other known computer-aided design tool. A computer readable medium may be any medium capable of carrying those instructions and include a CD-ROM, DVD, magnetic or other optical disc, tape, silicon memory (e.g., removable, non-removable, volatile or non-volatile), packetized or non-packetized data through wireline or wireless transmissions locally or remotely through a network. A computer is herein intended to include any device that has a general, multi-purpose or single purpose processor as described above.

It should be understood that the computer program products, processes, apparatuses, and systems described herein can take the form of entirely hardware embodiments, entirely software embodiments, or embodiments containing both hardware and software elements. If software is utilized to implement the method or system, the software may include but is not limited to firmware, resident software, microcode, etc.

It is understood that the computer program products, processes, apparatuses, and systems described herein may also be applied in other types of computer program products, processes, apparatuses, and systems. Those skilled in the art will appreciate that the various adaptations and modifications of the embodiments of the computer program products, processes, apparatuses, and systems described herein may be configured without departing from the scope and spirit of the present computer program products, processes, apparatuses, and systems. Therefore, it is to be understood that, within the scope of the appended claims, the present computer program products, processes, apparatuses, and systems may be practiced other than as specifically described herein.

I claim:

1. A hardware computer program product storing a computer readable program, wherein the computer readable program is executable by one or more computing devices to cause the one or more computing devices to perform operations comprising:

displaying, at a display device in operable communication with an end-user computing device and as part of a first portion of a graphical user interface (GUI), documentation associated with a software application;

receiving, at the end-user computing device, user input to the first portion of the GUI selecting at least one tree element from a list of tree elements displayed as part of the documentation;

causing, in response to the user selection, the at least one tree element to be populated to a second portion of the GUI;

receiving, at the end-user computing device, user input selecting a control feature from a plurality of selectable control features displayed in the GUI;

causing a control parameter of the at least one tree element to be configured based on the user input selecting the control feature;

generating, at the end-user computing device, a configuration file that configures the at least one tree element to operate according to the control feature; and causing the configuration file to be accessible to the software application to enable the software application to execute based at least in part on the configuration file.

2. The hardware computer program product of claim 1, wherein the configuration file is a GPO template.

3. The hardware computer program product of claim 1, wherein the configuration file is a plist file.

4. The hardware computer program product of claim 1, wherein the at least one tree element is a DOM tree element.

5. The hardware computer program product of claim 1, wherein the documentation is an HTML document.

6. The hardware computer program product of claim 1, wherein the control feature is a class.

7. The hardware computer program product of claim 1, wherein the control feature is a format.

8. The hardware computer program product of claim 1, wherein selection of the control feature is received via user input to one or more menus displayed as part of the second portion of the GUI.

9. A method comprising:

displaying, at a display device in operable communication with an end-user computing device and as part of a first portion of a graphical user interface (GUI), documentation associated with a software application;

receiving, at the end-user computing device, user input to the first portion of the GUI selecting at least one tree element from a list of tree elements displayed as part of the documentation;

causing, in response to the user selection, the at least one tree element to be populated to a second portion of the GUI;

receiving, at the end-user computing device, user input selecting a control feature from a plurality of selectable control features displayed in the GUI;

causing a control parameter of the at least one tree element to be configured based on the user input selecting the control feature;

generating, at the end-user computing device, a configuration file that configures the at least one tree element to operate according to the control feature; and causing the configuration file to be accessible to the software application to enable the software application to execute based at least in part on the configuration file.

10. The method of claim 9, wherein the configuration file is a GPO template.

11. The method of claim 9, wherein the configuration file is a plist file.

12. The method of claim 9, wherein the at least one tree element is a DOM tree element.

13. The method of claim 9, wherein the documentation is an HTML document.

14. The method of claim 9, wherein the control feature is a class.

15. The method of claim 9, wherein the control feature is a format.

16. The method of claim 9, wherein selection of the control feature is received via user input to one or more menus displayed as part of the second portion of the GUI.

17. A system comprising:

one or more processors; and one or more computer-readable storage media storing computer-executable instructions that are executable by the one or more processors to cause the system to perform operations including:

displaying, at an end-user computing device and as part of a first portion of a graphical user interface (GUI), documentation associated with a software application;

receiving, at the end-user computing device, user input to the first portion of the GUI selecting at least one tree element from a list of tree elements displayed as part of the documentation;

causing, in response to the user selection, the at least one tree element to be populated to a second portion of the GUI., receiving, at the end-user computing device, user input selecting a control feature from a plurality of selectable control features displayed in the GUI;

causing a control parameter of the at least one tree element to be configured based on the user input selecting the control feature;

generating, at the end-user computing device, a configuration file that configures the at least one tree element to operate according to the control feature; and causing the configuration file to be accessible to the software application to enable the software application to execute based at least in part on the configuration file.

18. A system as recited in claim 17, wherein the configuration file is a GPO template.

19. A system as recited in claim 17, wherein the configuration file is a plist file.

20. A system as recited in claim 17, wherein the documentation is an HTML document.

21. A system as recited in claim 17, wherein user selection of the at least one tree element comprises user selection of the tree element from a document object model (DOM) tree.

22. A system as recited in claim 17, wherein selection of the control feature is received via user input to one or more menus displayed as part of the second portion of the GUI.

23. A system as recited in claim 17, wherein selection of the at least one tree element comprises a drag and drop of the at least one tree element from the first portion of the GUI to the second portion of the GUI.

24. A system as recited in claim 17, wherein said generating occurs in response to a user selection of a selectable control of the GUI.

* * * * *